(12) United States Patent
Ward et al.

(10) Patent No.: US 10,776,889 B2
(45) Date of Patent: Sep. 15, 2020

(54) STAKEHOLDER EQUITY VALUATION IN COLLABORATIVE PROJECTS

(71) Applicant: International Business Machines Corporation, Armonk, NY (US)

(72) Inventors: Brett Ward, Raleigh, NC (US); Mark Delaney, Raleigh, NC (US); Robert H. Grant, Atlanta, GA (US); Al Chakra, Apex, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 38 days.

(21) Appl. No.: 16/148,098

(22) Filed: Oct. 1, 2018

(65) Prior Publication Data

US 2020/0104954 A1 Apr. 2, 2020

(51) Int. Cl.
*G06Q 50/18* (2012.01)
*G06Q 10/10* (2012.01)
*H04L 12/18* (2006.01)
*H04L 29/08* (2006.01)
*H04L 29/06* (2006.01)

(52) U.S. Cl.
CPC ......... *G06Q 50/184* (2013.01); *G06Q 10/101* (2013.01); *H04L 12/1831* (2013.01); *H04L 65/403* (2013.01); *H04L 67/22* (2013.01); *H04L 67/12* (2013.01)

(58) Field of Classification Search
CPC ..... G06Q 10/10–10/1093; H04L 67/22; H04L 12/1813–12/1831
See application file for complete search history.

(56) References Cited

U.S. PATENT DOCUMENTS

| | | | | |
|---|---|---|---|---|
| 7,188,069 B2* | 3/2007 | Hagelin | ............. | G06Q 10/0639 705/310 |
| 8,301,536 B2* | 10/2012 | Fulshaw | ................ | G06Q 40/06 705/35 |
| 10,628,457 B2* | 4/2020 | Barkie | .................... | H04W 4/02 |
| 2002/0049738 A1* | 4/2002 | Epstein | ................. | G06F 16/951 |

(Continued)

FOREIGN PATENT DOCUMENTS

WO 2015029073 A1 3/2015

OTHER PUBLICATIONS

Sauermann et al.; "Crowd Science User Contribution Patterns and Their Implications"; PNAS; vol. 112, No. 3; Jan. 20, 2015; pp. 679-684.

*Primary Examiner* — David R Lazaro
*Assistant Examiner* — Julian Chang
(74) *Attorney, Agent, or Firm* — Cantor Colburn LLP; Teddi Maranzano (57) ABSTRACT

An omnichannel platform for determining equity shares of users in a collaboration. The omnichannel platform executable by a processor coupled to a memory and being in communication with computing environments. The omnichannel platform acquires, from the computing environments, metadata with respect to user activity in the collaboration. The omnichannel platform evaluates the metadata for each of the users according to user position, user contribution, and end goal relatedness factors to produce valued user activity. The omnichannel platform determines equity shares of the users in the collaboration based on the valued user activity.

14 Claims, 5 Drawing Sheets

(56) References Cited

U.S. PATENT DOCUMENTS

| | | | |
|---|---|---|---|
| 2003/0018506 A1* | 1/2003 | McLean | G06Q 10/0637 |
| | | | 705/7.37 |
| 2005/0149401 A1* | 7/2005 | Ratcliffe | G06Q 10/10 |
| | | | 705/310 |
| 2005/0261927 A1* | 11/2005 | Bilak | G06Q 40/00 |
| | | | 705/36 R |
| 2008/0195464 A1* | 8/2008 | Brooks | G06Q 10/06 |
| | | | 705/7.42 |
| 2009/0094039 A1* | 4/2009 | MacDonald | G06Q 10/00 |
| | | | 705/300 |
| 2010/0114673 A1* | 5/2010 | Briggs | G06Q 10/10 |
| | | | 705/7.42 |
| 2013/0144639 A1 | 6/2013 | Hu et al. | |
| 2013/0254298 A1* | 9/2013 | Lorphelin | G06Q 10/06 |
| | | | 709/205 |
| 2014/0164262 A1* | 6/2014 | Graham | G06Q 10/06 |
| | | | 705/310 |
| 2014/0365254 A1 | 12/2014 | Giles | |
| 2015/0243176 A1* | 8/2015 | Zaslavsky | G06F 16/2228 |
| | | | 434/322 |
| 2015/0339020 A1* | 11/2015 | D'Amore | G06Q 10/101 |
| | | | 715/753 |
| 2015/0363743 A1* | 12/2015 | Maetz | G06Q 10/101 |
| | | | 705/7.13 |
| 2016/0034926 A1* | 2/2016 | Arroyo | G06Q 10/0637 |
| | | | 705/7.31 |
| 2016/0105517 A1* | 4/2016 | Pis | G06Q 10/101 |
| | | | 709/218 |
| 2016/0210710 A1* | 7/2016 | Glennon | G06Q 50/184 |
| 2016/0307571 A1* | 10/2016 | Mizumoto | H04L 12/1831 |
| 2017/0262877 A1* | 9/2017 | Davey | G06Q 30/0242 |
| 2018/0124129 A1* | 5/2018 | Geisler | H04L 67/06 |
| 2019/0098370 A1* | 3/2019 | Laeuchli | G06F 16/9024 |
| 2019/0130777 A1* | 5/2019 | Dey | H04L 12/18 |
| 2019/0295699 A1* | 9/2019 | Davey | G16H 40/67 |
| 2020/0007932 A1* | 1/2020 | Zavesky | H04N 21/44016 |

* cited by examiner

STAKEHOLDER EQUITY VALUATION IN COLLABORATIVE PROJECTS

BACKGROUND

The disclosure relates generally to evaluating individual intellectual contributions, and more specifically, to a system and method for stakeholder equity valuation in collaborative projects.

In general, group work is at the center of activity, such as in education systems or professional environments. Every day people come together to toil over creating new and innovative ideas, but determining contributor equity stakes in a product is decided by mutually agreed upon portions or percentages that can often lead to an arduous legal battle if ever disputed. There currently is no method to automatically evaluate individual contributions to an intellectual product to determine stakeholder ownership.

SUMMARY

According to one or more embodiments, an omnichannel platform for determining equity shares of users in a collaboration. The omnichannel platform executable by a processor coupled to a memory and being in communication with computing environments. The omnichannel platform acquires, from the computing environments, metadata with respect to user activity in the collaboration. The omnichannel platform evaluates the metadata for each of the users according to user position, user contribution, and end goal relatedness factors to produce valued user activity. The omnichannel platform determines the equity shares of the users in the collaboration based on the valued user activity.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter is particularly pointed out and distinctly claimed in the claims at the conclusion of the specification. The foregoing and other features, and advantages of the embodiments herein are apparent from the following detailed description taken in conjunction with the accompanying drawings in which:

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, as discussed above, a solution is needed that evaluates multiple elements of individual contributions and roles in development across multiple platforms and applications with respect to progress toward project goals to determine stakeholder equity.

Turning now to an overview of the aspects of the invention, one or more embodiments of the invention address the above-described shortcomings of the prior art by evaluating individuals' contributions in the creation of intellectual property (e.g., dissertation, code, product, project, etc.) and generating summary statistics for contributions to assist stakeholders in assigning equity values. Embodiments disclosed herein may include system, method, and/or computer program product (herein a system) that implement value weighting on individuals' role in development (e.g., leader, manager, scribe, coding), amount contributed, type of contribution, and end goal relatedness (e.g., how much a product component is related to a main project statement) to determine the equity assigned to contributors. Technical effects and benefits of embodiments herein include providing an analytical approach and multi-variate analysis for assessing individual stakeholder contributions and supplementing equity determination. Thus, embodiments described herein are necessarily rooted in a processor or a computing platform to perform proactive operations to overcome problems specifically arising in the realm of evaluating individual intellectual contributions (e.g., these problems include the lack of method to automatically evaluate individual contributions to an intellectual product, resulting in unwanted costs and expenses).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
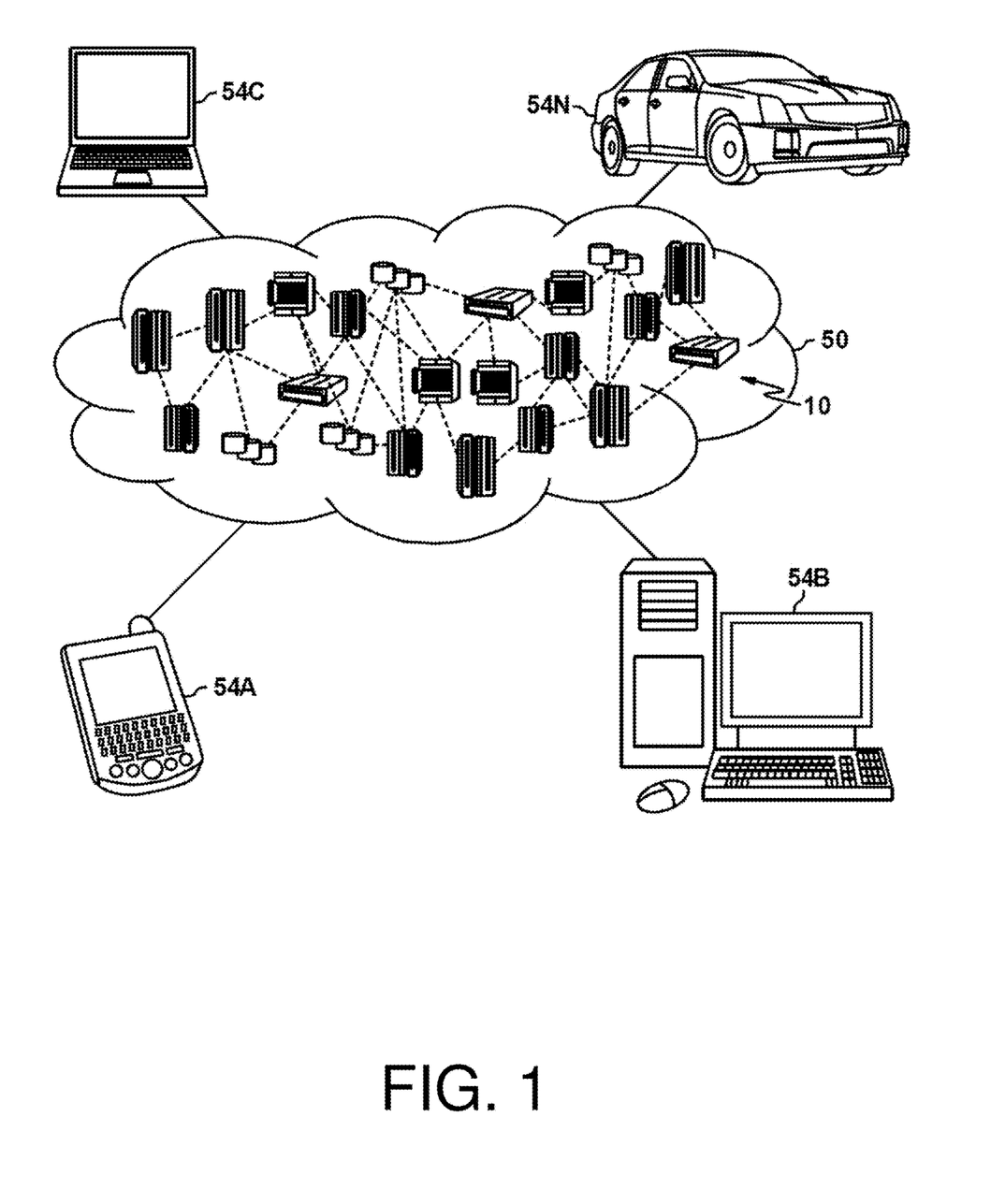
FIG. 1 depicts a cloud computing environment in accordance with one or more embodiments.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
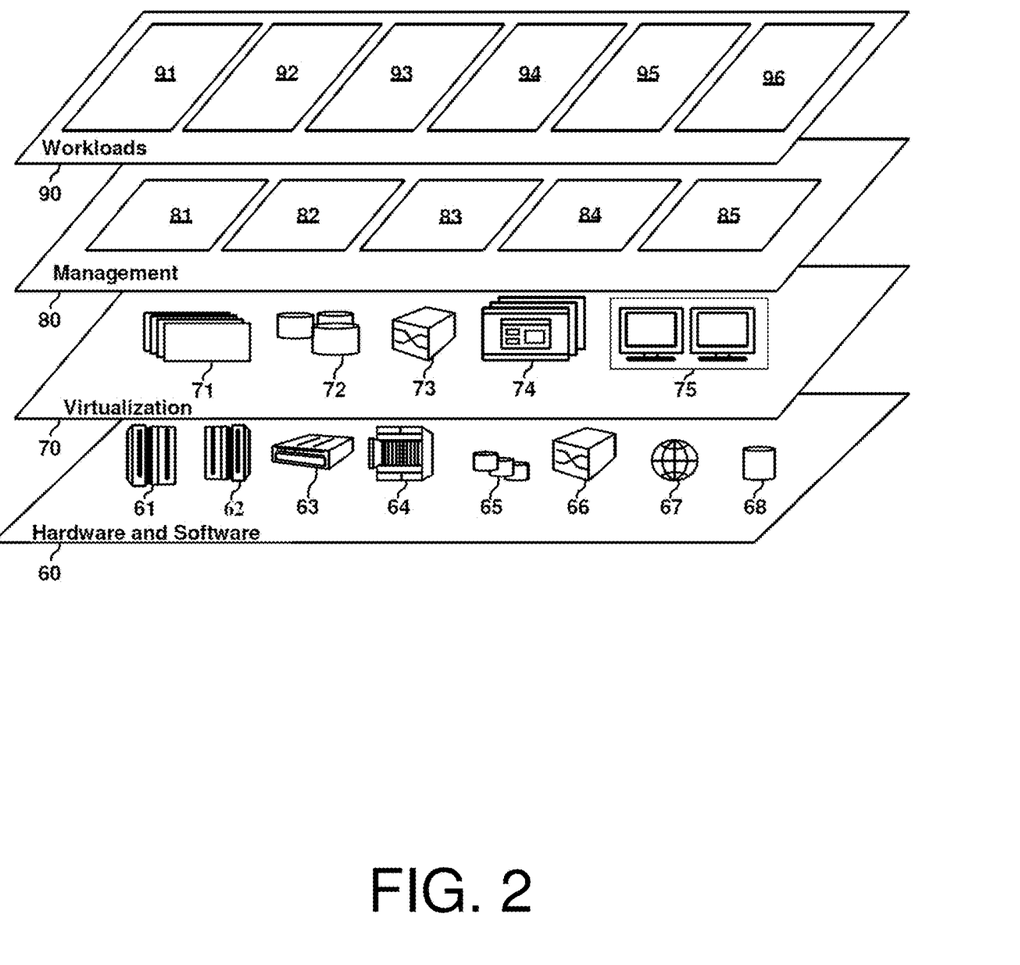
FIG. 2 depicts abstraction model layers in accordance with one or more embodiments.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and value waiting contributions 96.

Figure 3:
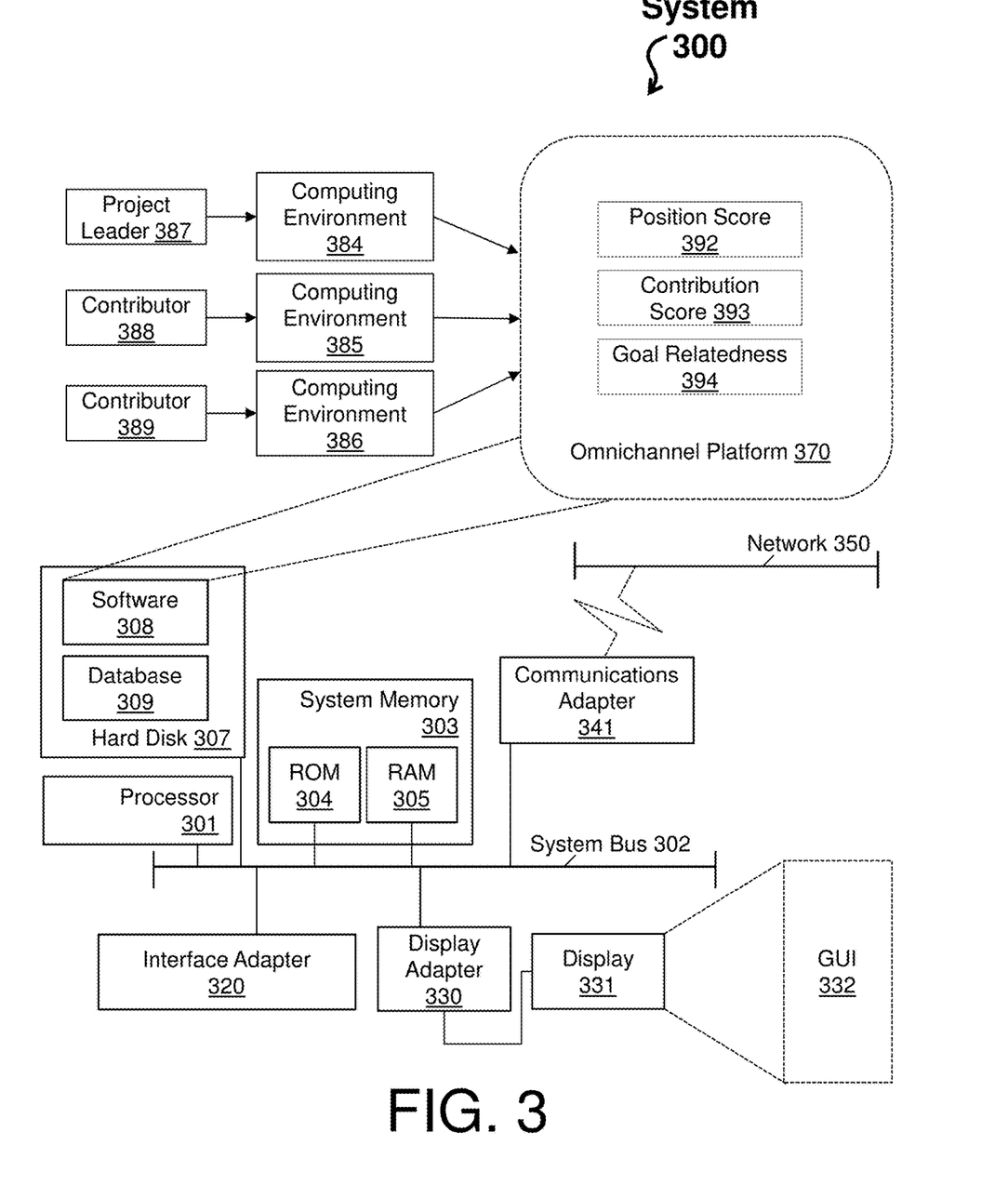
FIG. 3 depicts a platform in accordance with one or more embodiments.

Turning now to FIG. 3, a system 300 for implementing the teachings herein is shown in according to one or more embodiments of the invention. The system 300 can represent one or more cloud computing nodes 10 of FIG. 1. The system 300 can be an electronic, computer framework comprising and/or employing any number and combination of computing device and networks utilizing various communication technologies, as described herein. The system 300 can be easily scalable, extensible, and modular, with the ability to change to different services or reconfigure some features independently of others In this embodiment, the system 300 has a processor 301, which can include one or more central processing units (CPUs). The processor 301, also referred to as a processing circuit, microprocessor, computing unit, is coupled via a system bus 302 to a system memory 303 and various other components. The system memory 303 includes read only memory (ROM) 304 and random access memory (RAM) 305. The ROM 304 is coupled to the system bus 302 and may include a basic input/output system (BIOS), which controls certain basic functions of the system 300. The RAM is read-write memory coupled to the system bus 302 for use by the processor 301.

The system 300 of FIG. 3 includes a hard disk 307, which is an example of a tangible storage medium readable executable by the processor 301. The hard disk 307 stores software 308 and database 309. The software 308 is stored as instructions for execution on the system 300 by the processor 301 (to perform process, such as the process flows of FIGS. 4-5). The database 309 includes a set of values of qualitative or quantitative variables organized in various data structures to support and be used by operations of the software 308.

The system 300 of FIG. 3 includes one or more adapters (e.g., hard disk controllers, network adapters, graphics adapters, etc.) that interconnect and support communications between the processor 301, the system memory 303, the hard disk 307, and other components of the system 300 (e.g., peripheral and external devices). In one or more embodiments of the present invention, the one or more adapters can be connected to one or more I/O buses that are connected to the system bus 302 via an intermediate bus bridge, and the one or more I/O buses can utilize common protocols, such as the Peripheral Component Interconnect (PCI).

As shown, the system 300 includes an interface adapter 320 that can interconnect a keyboard, a mouse, a speaker, a microphone, etc. to the system bus 302. The system 300 includes a display adapter 330 interconnecting the system bus 302 to a display 331. The display adapter 330 (and/or the processor 301) can include a graphics controller to provide graphics performance, such as a display and management of a GUI 332. A communications adapter 341 interconnects the system bus 302 with a network 350 enabling the system 300 to communicate with other systems, devices, data, and software, such as a server and a database. In one or more embodiments of the present invention, the operations of the software 308 and the data 309 can be implemented on the network 350. For instance, the network 350 and components thereon can combine to provide internal iterations of the software 308 and the data 309 as a platform as a service, a software as a service, and/or infrastructure as a service (e.g., as a web application in a distributed system).

Thus, as configured in FIG. 3, the operations of the software 308 and the data 309 (e.g., the system 300) are necessarily rooted in the computational ability of the processor 301 to overcome and address the herein-described shortcomings specifically arising in the realm of evaluating individual intellectual contributions. In this regard, the software 308 and the data 309 improve the computational operations of the processor 301 of the system 300 (thereby increasing the efficiency of the system 300).

For instance, an example schematic of the software 309 is depicted as an omnichannel platform 370. The omnichannel platform 370 executable by the processor 301, which is coupled to the system memory 303. The omnichannel platform 370, in general, a tool where all product components are pulled together to generate a collaboration (e.g., a final product, project, dissertation, and code). Example scenarios for implementing the system 300 and the omnichannel platform 370 include, but are not limited to evaluating group projects in an educational setting and plagiarism detection, settling IP ownership and equity disputes, employee performance evaluations, determining pay structures in consulting projects, and individual skill analysis. The omnichannel platform 370 is in communication with one or more computing environments 384, 385, and 386, which provide the product components.

The one or more computing environments 384, 385, and 386 can be any system, device, or software where the product components are generated. Examples of the one or more computing environments 384, 385, 386 include but are not limited to word processing, spreadsheet processing, video editing, audio editing, hypertext markup language (HTML) coding, web development platforms, input/editing tools, a collaborative tool, and the like.

Metadata is associated with the product components created in the one or more computing environments 384, 385, and 386. Examples of the metadata include but are not limited to user activity type, amount of active time spent drafting/creating/editing, amount of inputs provided/edited, relatedness of product components, and the like. Note that accuracy of the equity distribution is dependent on details of the metadata.

The omnichannel platform 370 determines equity shares of one or more users (e.g., project leader 387, contributor 388, and contributor 389) in the collaboration. For example, the omnichannel platform 370 implements value weighting on the product components based on user position (e.g., each of the one or more users' role in development, such as leader, manager, scribe, coding), user contribution (e.g., such as an amount contributed, type of contribution), and end goal relatedness factors to determine an equity share assigned to the one or more users. Note that the one or more users can input their role in the collaboration (e.g., if a specific user is a main intellectual property creator, that specific user can manually input that they are sole generator of underlying collaboration. The omnichannel platform 370 executes the value weighting of the user position, the user contribution, and the end goal relatedness factors by respectively utilizing position score 392, contribution score 393, and goal relatedness 394 metrics.

The omnichannel platform 370 and one or more computing environments 384, 385, and 386 illustrate a map of how individual contributions are collated into a single location where equity analysis can be conducted. Each the one or more users (e.g., project leader 387, contributor 388, and contributor 389) develops contributions in a variety of applications (e.g., the one or more computing environments 384, 385, and 386) and then these contributions would be combined into a single base platform (e.g., the omnichannel platform 370). Thus, the omnichannel platform 370 provides an analytical approach and multi-variate analysis for assessing individual stakeholder contributions and supplementing equity determinations.

In addition, the omnichannel platform 370 can be manually modified by a user, such as the project leader 387 or a project manager, and can employ a learning functionality loop including peer to peer reviews and manager insights. An operation of the system 300 and the omnichannel platform 370 is described with respect to FIG. 4.

Figure 4:
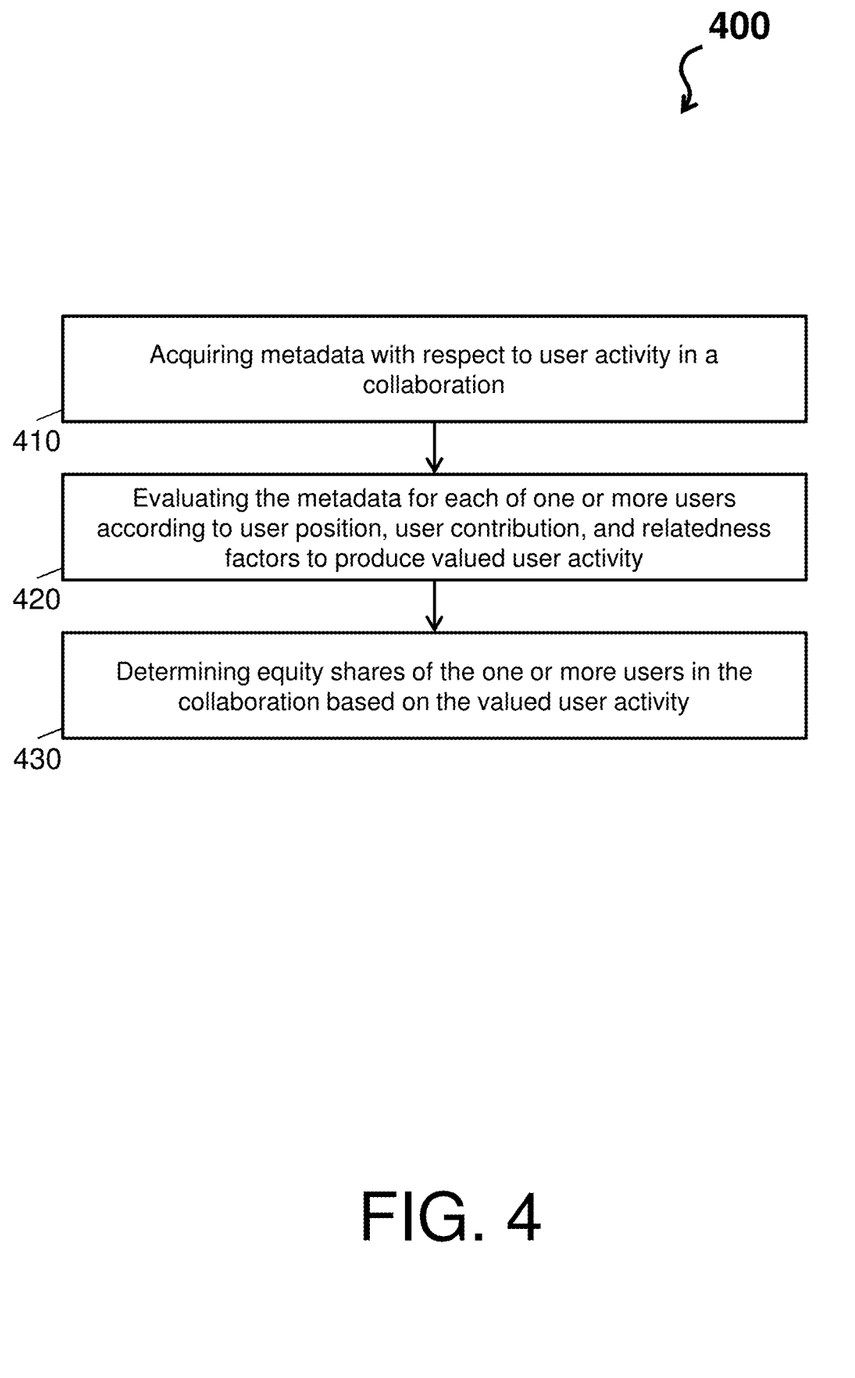
FIG. 4 depicts a process flow in accordance with one or more embodiments.

FIG. 4 depicts a process flow 400 in accordance with one or more embodiments. The process flow 400 is an example of a computer-implemented method by the system 300 and the omnichannel platform 370 of FIG. 3 for determining equity shares of the one or more users (e.g., project leader 387, contributor 388, and contributor 389) in a collaboration. The process flow 400 begins at block 410, where the omnichannel platform 370 acquires, from the one or more computing environments 384, 385, and 386, metadata with respect to user activity in the collaboration. In accordance with one or more embodiments, the omnichannel platform 370 can automatically receive the metadata in real-time from the one or more computing environments 384, 385, and 386 as the one or more users save and/or complete their contributions and/or the forwarding of the metadata can be user-driven.

At block 420, the omnichannel platform 370 evaluates the metadata for each of one or more users according to user position, user contribution, and end goal relatedness factors to produce valued user activity (e.g., user contribution). In accordance with one or more embodiments, user position can be valued by a position score corresponding to a leadership responsibility of any user in the collaboration. The position score can be any number A that is greater than or equal to one and less than or equal to two (i.e., $1 \leq A \leq 2$). The user contribution can be valued by a contribution score corresponding to an amount of active time spent drafting/creating/editing and/or an amount of inputs provided/edited for product components of the collaboration. The contribution score be represented by any number B that is greater than or equal to zero and less than or equal to one (i.e., $0 \leq B \leq 1$). The end goal relatedness can be valued by a goal relatedness score corresponding to a relatedness of product components to project goal, milestone, or description of the collaboration. The goal relatedness score can be any number C that is greater than or equal to zero and less than or equal to one (i.e., $0 \leq C \leq 1$). The position score, the contribution score, and the goal relatedness score can be multiplied by the omnichannel platform to determine the valued user activity on a per-user basis.

At block 430, the omnichannel platform 370 determines equity shares of the one or more users in the collaboration based on the valued user activity. In accordance with one or more embodiments, Equations 1 and 2 can be utilized for equity shares on the valued user activity, where $X_1$, $X_2$, $X_3$ correspond to different contributors 1, 2, 3; $X_1^e$ is an equity share (%) of the contributor 1; L is a position coefficient ($1 \leq L \leq 2$ dependent on involvement level); $T_i$ is a total duration (time in hours) to complete task "i" (e.g., product component); $t_i$ is an individual contribution (time in hours) to task "i" (e.g., product component); $r_i$ is a relatedness of task "i" to project goal, milestone, description (e.g., $0 \leq r \leq 1$, dependent on text and image processing analysis and similarity comparison where 1 is the most similar).

$$X_1 = L\left\{\left(\frac{t_i}{T_i} * r_i\right) + \left(\frac{t_{ii}}{T_{ii}} * r_i\right) + \left(\frac{t_{...}}{T_{...}} * r_{...}\right)\right\} \quad \text{Equation 1}$$

$$X_1 = \frac{X_1}{X_1 + X_2 + X ...} \quad \text{Equation 2}$$

Figure 5:
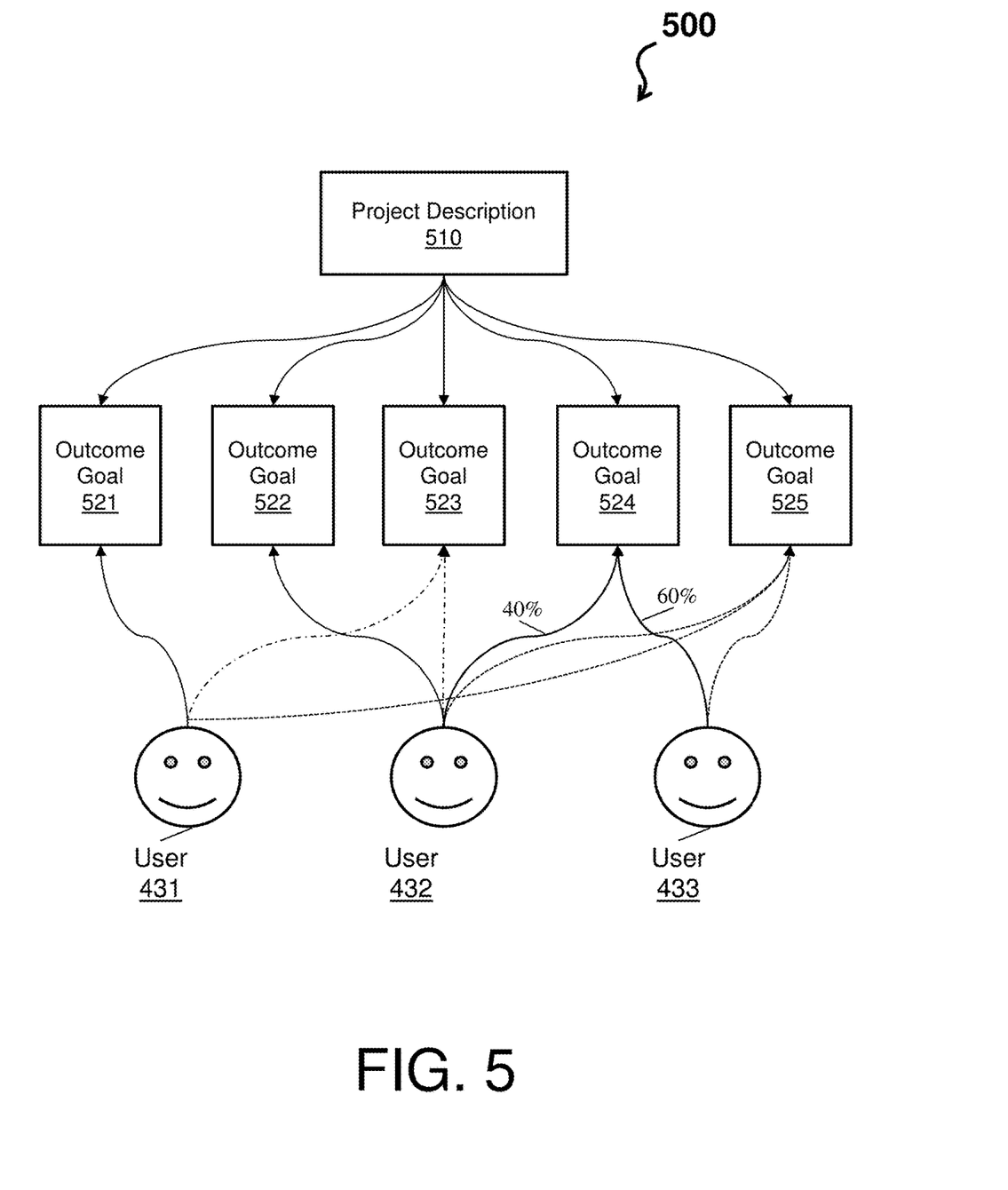
FIG. 5 depicts an operational flow in accordance with one or more embodiments.

FIG. 5 depicts an operational flow 500 in accordance with one or more embodiments. As shown in FIG. 5, the operational flow 500 includes a project decryption 510, outcome goals 521, 522, 523, 524, and 525, and users 431, 432, and 433.

The operational flow 500 represents a high-level analysis of user contributions based on recognized project outcome goals 521, 522, 523, 524, and 525 (stored in an omnichannel platform). From the project description, 510 the omnichannel platform (e.g., the channel platform 370 of FIG. 3) can pull out the outcome goals 521, 522, 523, 524, and 525 or these can be laid out in detail through manual input.

In this example, user 431, user 432, and user 433 are working on creating and posting a website for their financial planning business and various elements are outlined as requirements for the end-product, such as secure log-in feature for registered clients (e.g., outcome goal 524), ability for potential customers to submit their email to receive more information (e.g., outcome goal 522), and creating and a video embedding in home page which provides overview of services (e.g., outcome goal 521).

User 431 schedules all meetings and speech recognition by the omnichannel platform enables a determination that user 431 is first to speak and guide discussion (e.g., collected via microphone in conference call); and user 432 sends out meeting minutes via email following every meeting (e.g., each related to outcome goal 523). User 431 spends 27 hours filming and editing a video for a website home page (e.g., outcome goal 521). User 432 creates a wireframe for the website including the interlinked pages and placeholders on each page. User 432 and user 433 are working on the secure log-in feature (e.g., outcome goal 524), and analysis contributions of coding shows that user 433 contributed 60% of code and user 432 contributed 40%. User 433 spends 12 hours writing text and placing in placeholders on each page (e.g., outcome goal 525). User 431 spends 3 hours viewing and editing text created by User 433 (e.g., outcome goal 525). User 432 calls a web hosting company to purchase a domain name and hosting services (e.g., outcome goal 525).

The omnichannel platform utilizes this information to analytically weigh the contributions of user 432, user 433, and user 431. User 431 is listed as the project lead and is given a slightly higher value weighting. The video by user 431 worked to create also highly correlates to the goals set forth in the project description and thus is weighted highly (e.g., outcome goal 521). User 432 and user 433 both made significant contributions in developing the security features (e.g., outcome goal 524), which are rated of higher importance on the project description, thus of greater weighting to contribution value. All factors are combined to determine the respective equity values for user 431, user 433, and user 432, which then determines the financial distribution of profits/benefits generated by the website. A manual feedback loop may be used to allow users to approve or disapprove of an equity distribution.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the User 432 etplace, or to enable others of ordinary skill in the art to understand the embodiments disclosed herein.

What is claimed is:

1. A computer-implemented method by an omnichannel platform for determining equity shares of one or more users in a collaboration, the omnichannel platform executable by a processor coupled to a memory, the omnichannel platform in communication with one or more computing environments, the computer-implemented method comprising:
    acquiring, from the one or more computing environments by the omnichannel platform, metadata with respect to user activity in the collaboration;
    evaluating, by the omnichannel platform, the metadata for each of one or more users according to user position, user contribution, and end goal relatedness factors to produce valued user activity; and
    determining, by the omnichannel platform, equity shares of the one or more users in the collaboration based on the valued user activity,
    wherein the omnichannel platform automatically receives the metadata in real-time from the one or more computing environments as the user activity is saved or completed, and
    wherein a position score, a contribution score, and a goal relatedness score are multiplied by the omnichannel platform to determine the valued user activity on a per user basis, the user position corresponding to the position score, the user contribution corresponding to the contribution score, and the end goal relatedness corresponding to the goal relatedness score.

2. The computer-implemented method of claim 1, wherein the metadata is associated with product components of the collaboration created in the one or more computing environments and includes user activity type, amount of active time spent, amount of inputs, and relatedness of product components.

3. The computer-implemented method of claim 1, wherein the position score corresponds to a leadership responsibility of any of the one or more users in the collaboration.

4. The computer-implemented method of claim 1, wherein the contribution score corresponds to an amount of active time spent drafting, creating, or editing product components of the collaboration or an amount of inputs provided or edited for the product components of the collaboration.

5. The computer-implemented method of claim 1, wherein the relatedness score corresponds to a relatedness of product components to project goal, milestone, or description of the collaboration.

6. A computer program product for determining equity shares of one or more users in a collaboration, the computer program product comprising a computer readable storage medium having program instructions of an omnichannel platform embodied therewith, the omnichannel platform in communication with one or more computing environments, the program instructions and the omnichannel platform executable by a processor to cause:
    acquiring, from the one or more computing environments by the omnichannel platform, metadata with respect to user activity in the collaboration;
    evaluating, by the omnichannel platform, the metadata for each of one or more users according to user position, user contribution, and end goal relatedness factors to produce valued user activity; and
    determining, by the omnichannel platform, equity shares of the one or more users in the collaboration based on the valued user activity,
    wherein the omnichannel platform automatically receives the metadata in real-time from the one or more computing environments as the user activity is saved or completed, and
    wherein a position score, a contribution score, and a goal relatedness score are multiplied by the omnichannel platform to determine the valued user activity on a per user basis, the user position corresponding to the position score, the user contribution corresponding to the contribution score, and the end goal relatedness corresponding to the goal relatedness score.

7. The computer program product of claim 6, wherein the metadata is associated with product components of the collaboration created in the one or more computing environments and includes user activity type, amount of active time spent, amount of inputs, and relatedness of product components.

8. The computer program product of claim 6, wherein the position score corresponds to a leadership responsibility of any of the one or more users in the collaboration.

9. The computer program product of claim 6, wherein the contribution score corresponds to an amount of active time spent drafting, creating, or editing product components of the collaboration or an amount of inputs provided or edited for the product components of the collaboration.

10. The computer program product of claim 6, wherein the relatedness score corresponds to a relatedness of product components to project goal, milestone, or description of the collaboration.

11. A system for determining equity shares of one or more users in a collaboration, the system comprising one or more computing environments and an omnichannel platform executable by a processor coupled to a memory, the omnichannel platform in communication with the one or more computing environments, the program instructions executable by a processor to cause the system to perform:
   acquiring, from the one or more computing environments by the omnichannel platform, metadata with respect to user activity in the collaboration;
   evaluating, by the omnichannel platform, the metadata for each of one or more users according to user position, user contribution, and end goal relatedness factors to produce valued user activity; and
   determining, by the omnichannel platform, equity shares of the one or more users in the collaboration based on the valued user activity,
   wherein the omnichannel platform automatically receives the metadata in real-time from the one or more computing environments as the user activity is saved or completed, and
   wherein a position score, a contribution score, and a goal relatedness score are multiplied by the omnichannel platform to determine the valued user activity on a per user basis, the user position corresponding to the position score, the user contribution corresponding to the contribution score, and the end goal relatedness corresponding to the goal relatedness score.

12. The system of claim 11, wherein the metadata is associated with product components of the collaboration created in the one or more computing environments and includes user activity type, amount of active time spent, amount of inputs, and relatedness of product components.

13. The system of claim 11, wherein the position score corresponds to a leadership responsibility of any of the one or more users in the collaboration.

14. The system of claim 11, wherein the contribution score corresponds to an amount of active time spent drafting, creating, or editing product components of the collaboration or an amount of inputs provided or edited for the product components of the collaboration, or wherein the relatedness score corresponds to a relatedness of product components to project goal, milestone, or description of the collaboration.

* * * * *